US012352179B1

(12) United States Patent
Patil et al.

(10) Patent No.: US 12,352,179 B1
(45) Date of Patent: Jul. 8, 2025

(54) TURBINE ENGINE INCLUDING A LUBRICATION SYSTEM (71) Applicant: General Electric Company, Cincinnati, OH (US)

(72) Inventors: Pravin Patil, Bengaluru (IN); Narendra Hardikar, Bengaluru (IN); Andrew Gumpert, West Chester Township, OH (US); Duane H. Anstead, Fairfield, OH (US); Brandon W. Miller, Liberty Township, OH (US); Ryan T. Roehm, West Chester, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/782,608

(22) Filed: Jul. 24, 2024

(51) Int. Cl.
F02C 7/06 (2006.01)
F01D 25/18 (2006.01)
F02C 3/04 (2006.01)
F02C 7/36 (2006.01)

(52) U.S. Cl.
CPC ............... F01D 25/18 (2013.01); F02C 3/04 (2013.01); F02C 7/06 (2013.01); F02C 7/36 (2013.01); F05D 2260/4031 (2013.01); F05D 2260/98 (2013.01)

(58) Field of Classification Search
CPC .. F01D 25/18; F01D 25/20; F02C 3/04; F02C 7/06; F02C 7/36; F05D 2260/4031; F05D 2260/98
See application file for complete search history.

(56) References Cited

U.S. PATENT DOCUMENTS

| 2,551,660 | A | * | 5/1951 | Feilden ............... F01D 25/20 184/6.13 |
| 4,717,000 | A | | 1/1988 | Waddington et al. |
| 9,062,611 | B2 | | 6/2015 | Sheridan |
| 9,488,104 | B2 | | 11/2016 | Junod |
| 10,072,521 | B2 | | 9/2018 | Mastro et al. |
| 10,287,916 | B2 | | 5/2019 | Snyder et al. |
| 10,711,877 | B2 | | 7/2020 | Fisher et al. |
| 11,313,454 | B2 | | 4/2022 | Davies |

(Continued)

FOREIGN PATENT DOCUMENTS

| EP | 1722074 A2 | 11/2006 |
| EP | 2538118 B1 | 2/2015 |

(Continued)

Primary Examiner — Steven M Sutherland
(74) Attorney, Agent, or Firm — Venable LLP; Duarte Y Ho; Michele V. Frank (57) ABSTRACT A turbine engine includes a first gearbox, lubricated by oil. A first sump, located below the first gearbox, collects the oil. A first scavenge element pumps the oil from the first sump in an operational state and does not pump the oil in a failure state. A second gearbox is also lubricated by oil. A second sump, located below the second gearbox, collects the oil. A second scavenge element pumps the oil from the second sump in both the operational state and in the failure state. A conduit connects the first sump to the second sump to transfer overflow oil from the first sump to the second sump in the failure state, the overflow oil combining with the oil in the second sump, upon the oil in the first sump reaching a threshold level.

20 Claims, 8 Drawing Sheets (56) References Cited

U.S. PATENT DOCUMENTS

| | | | |
|---|---|---|---|
| 11,428,163 B2 | 8/2022 | Parnin | |
| 11,519,297 B2 | 12/2022 | Booth et al. | |
| 2005/0166570 A1* | 8/2005 | Granitz | F16N 7/40 60/39.08 |
| 2006/0249332 A1 | 11/2006 | Bruce | |
| 2009/0107770 A1 | 4/2009 | Mischler et al. | |
| 2017/0314469 A1* | 11/2017 | Roever | F02C 7/36 |
| 2021/0079845 A1* | 3/2021 | Wilson | F02C 7/36 |

FOREIGN PATENT DOCUMENTS

| | | |
|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| FR | 3130747 A1 | 6/2023 |
| FR | 3130874 A1 | 6/2023 |
| FR | 3130875 A1 | 6/2023 |
| FR | 3130877 A1 | 6/2023 |
| FR | 3130895 A1 | 6/2023 |

\* cited by examiner

TURBINE ENGINE INCLUDING A LUBRICATION SYSTEM

TECHNICAL FIELD

The present disclosure relates generally to turbine engines having a lubrication system.

BACKGROUND

Turbine engines, for example, for aircraft, generally include a fan and a core section arranged in flow communication with one another. Turbine engines additionally include one or more gearboxes, or other internal components requiring lubrication by a lubricant, such as an oil. Interruption of a portion of the oil system, such as a scavenge system, could result in oil overfilling of a sump and flooding a gearbox with the oil. A system for removing excess oil from the sump in a scavenge interruption state, or failure state, prevents flooding the gearbox.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position on the turbine engine that is closer to the propeller or the fan and aft refers to a position on the turbine engine that is further away from the propeller or the fan.

As used herein, the term "axial" refers to directions and orientations that extend substantially parallel to a centerline of the turbine engine. Moreover, the terms "radial" and "radially" refer to directions and orientations that extend substantially perpendicular to the centerline of the turbine engine, unless otherwise specified. In addition, as used herein, the terms "circumferential" and "circumferentially" refer to directions and orientations that extend arcuately about the centerline of the turbine engine, unless otherwise specified.

As used herein, the terms "low" and "high," or their respective comparative degrees (e.g., "lower" and "higher", where applicable), when used with compressor, combustor, turbine, shaft, fan, or turbine engine components, each refers to relative pressures, relative speeds, relative temperatures, or relative power outputs within an engine unless otherwise specified. For example, a "low-power" setting defines the engine or the combustor configured to operate at a power output lower than a "high-power" setting of the engine or the combustor. The terms "low" or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine. A mission cycle for a turbine engine includes, for example, a low-power operation, a mid-level power operation, and a high-power operation. Low-power operation includes, for example, engine start, idle, taxiing, and approach. Mid-level power operation includes, for example, cruise. High-power operation includes, for example, takeoff and climb.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, a "turbo-engine" includes a compressor section, a combustor, and a turbine section.

As used herein, a "turbofan engine" includes a turbo-engine and a fan that directs air into the turbo-engine, and rated for use in a regional aircraft, narrow body aircraft, or wide body aircraft. A turbofan engine rated for use on a regional aircraft will have a maximum takeoff thrust in a range of ten thousand pound-force to twenty thousand pound-force (10,000 lbf to 20,000 lbf). A turbofan engine rated for use on a narrow body aircraft will have a maximum takeoff thrust in a range of fifteen thousand pound-force to thirty thousand pound-force (15,000 lbf to 30,000 lbf). A turbofan engine rated for use on a wide body aircraft will have a maximum takeoff thrust in a range of forty thousand pound-force to one hundred ten thousand pound-force (40,000 lbf to 110,000 lbf).

As used herein, the term "ducted engine" means a turbofan engine with a fan casing or nacelle that circumferentially surrounds the fan.

As used herein, an "unducted fan engine" or an "open fan engine" means a turbofan engine without a fan casing or a nacelle surrounding the fan.

Hereafter, the term "turbofan engine" will refer to either a "ducted engine" or an "open fan engine."

Approximating language, as used herein throughout the specification and claims, is applied to modify any quantitative representation that could permissibly vary without resulting in a change in the basic function to which it is related. Accordingly, a value modified by a term or terms, such as "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

As used herein, the terms "lubricant" and "oil" are used interchangeably, and refer to any liquid lubricant applied to the interface between internal components making contact within the turbine engine, such as within a gearbox. The "lubricant" and "oil" are applied in order to remove heat from the contacting components, to reduce or to minimize friction between contacting components, to provide smooth relative motion between contacting components, to reduce operational drag, to prevent damage, and to prolong the life of the internal components. The "lubricant" and the "oil" may include conventional or synthetic oils, currently known, or to be discovered or developed in the future.

In order to provide adequate lubrication to the internal components of a turbine engine, such as in a gearbox, an oil circulation system moves oil throughout the turbine engine. The oil circulation system presents oil to various interfaces between solid components moving relatively to one another. Continuous lubrication requires a circulation system to provide a continuous supply of oil to the various interfaces. Oil is scavenged from one or more sumps and/or gearboxes by one or more scavenge pumps in an operational state and transferred to an oil tank. During failure of a scavenge pump, otherwise referred to as a failure state, one of the one or more sumps and/or gearboxes may become overfilled. A sump overflow arrangement provides oil to the oil tank in a scavenge pump failure state.

Modern turbine engines have modern sump architectures, resulting in smaller sumps than in traditional turbine engines. Consequently, the smaller sumps, also referred to as split sumps, fill relatively quicker, and with a lesser volume of oil, during a failure state of the scavenge pump. When overfilled, a gearbox, typically arranged closer to the longitudinal centerline axis of the turbine engine, may become flooded with oil. Flooding of a gearbox creates excess drag on the gearbox, which reduces overall efficiency. Flooding of a gearbox results in oil churning, which, in turn, generates excess viscous heat in the oil. Such excess heat can damage the components of the gearbox and can degrade or damage the oil.

Figure 1:
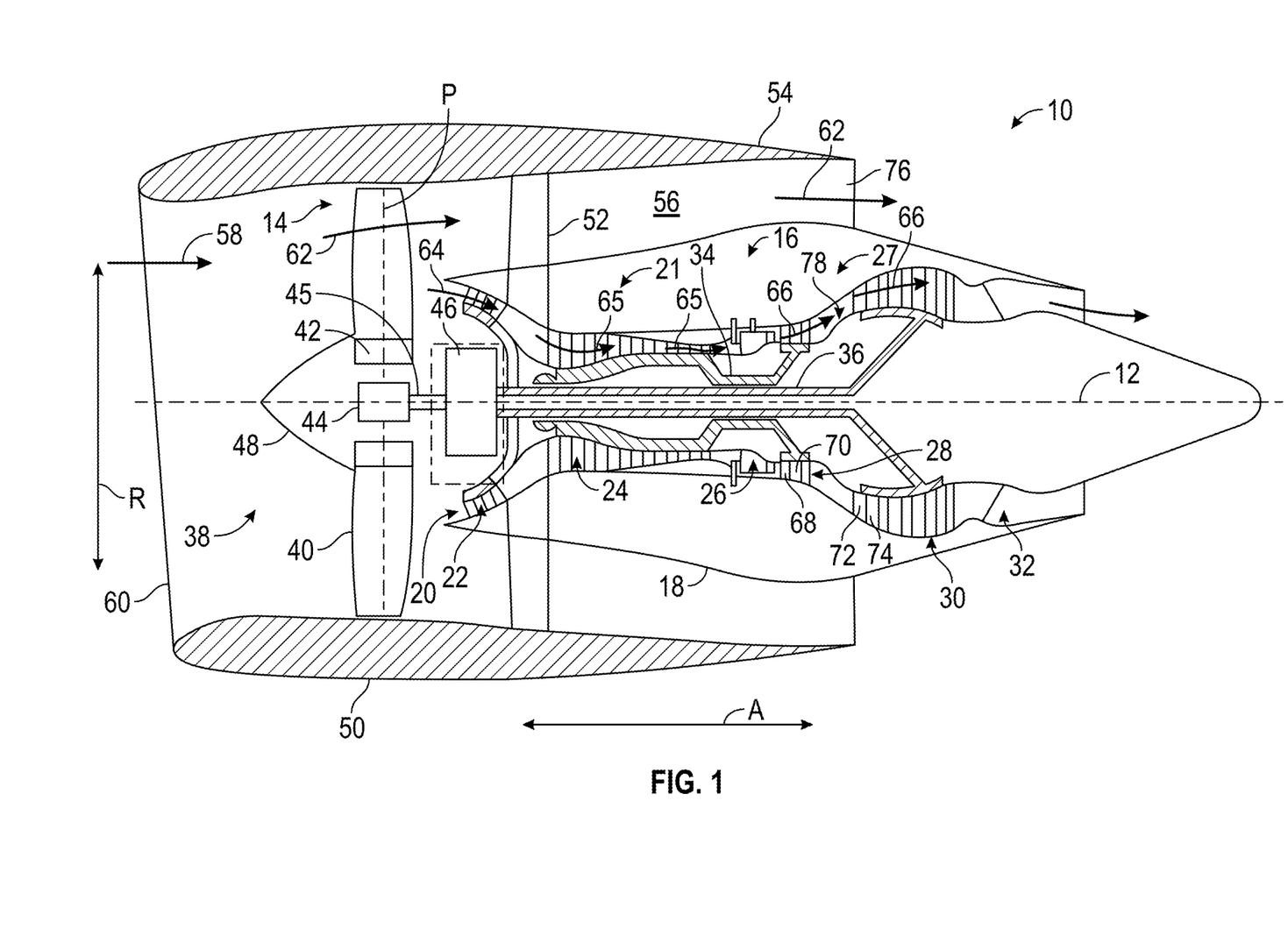
FIG. 1 is a schematic cross-sectional diagram of a turbine engine, taken along a centerline axis of the turbine engine, according to the present disclosure.

Referring now to the drawings, FIG. 1 is a schematic cross-sectional diagram of a turbine engine 10, such as a gas turbine engine, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 21, a combustor 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low pressure (LP) compressor 22 followed downstream by a high pressure (HP) compressor 24. The combustor 26 is downstream of the compressor section 21. The turbine section 27 is downstream of the combustor 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34 or a spool, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustor 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 are rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. The pressure of the core air 64 is then increased, generating compressed air 65. The compressed air 65 is routed through the HP compressor 24 and into the combustor 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 includes a fuel system that provides fuel to the combustor 26. The fuel is mixed with the compressed air 65 from the HP compressor 24 and ignited in the combustor 26 to produce the combustion gases 66. The fuel system may include a fuel tank or a fuel supply for storing the fuel therein, a fuel supply line, and a fuel injector. The fuel is provided from the fuel tank, along the fuel supply line to the fuel injector, which introduces the fuel into the combustor 26. The fuel system may include one or more flow control devices or valves along the fuel supply line for controlling an amount of the fuel provided to the combustor 26. The fuel injector may be provided at a forward end of the combustor 26. Accordingly, fuel provided along the fuel supply line is provided at a forward end of the combustor 26.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. A direct drive engine may nonetheless have one or more other gearboxes, known as "auxiliary gearboxes." Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
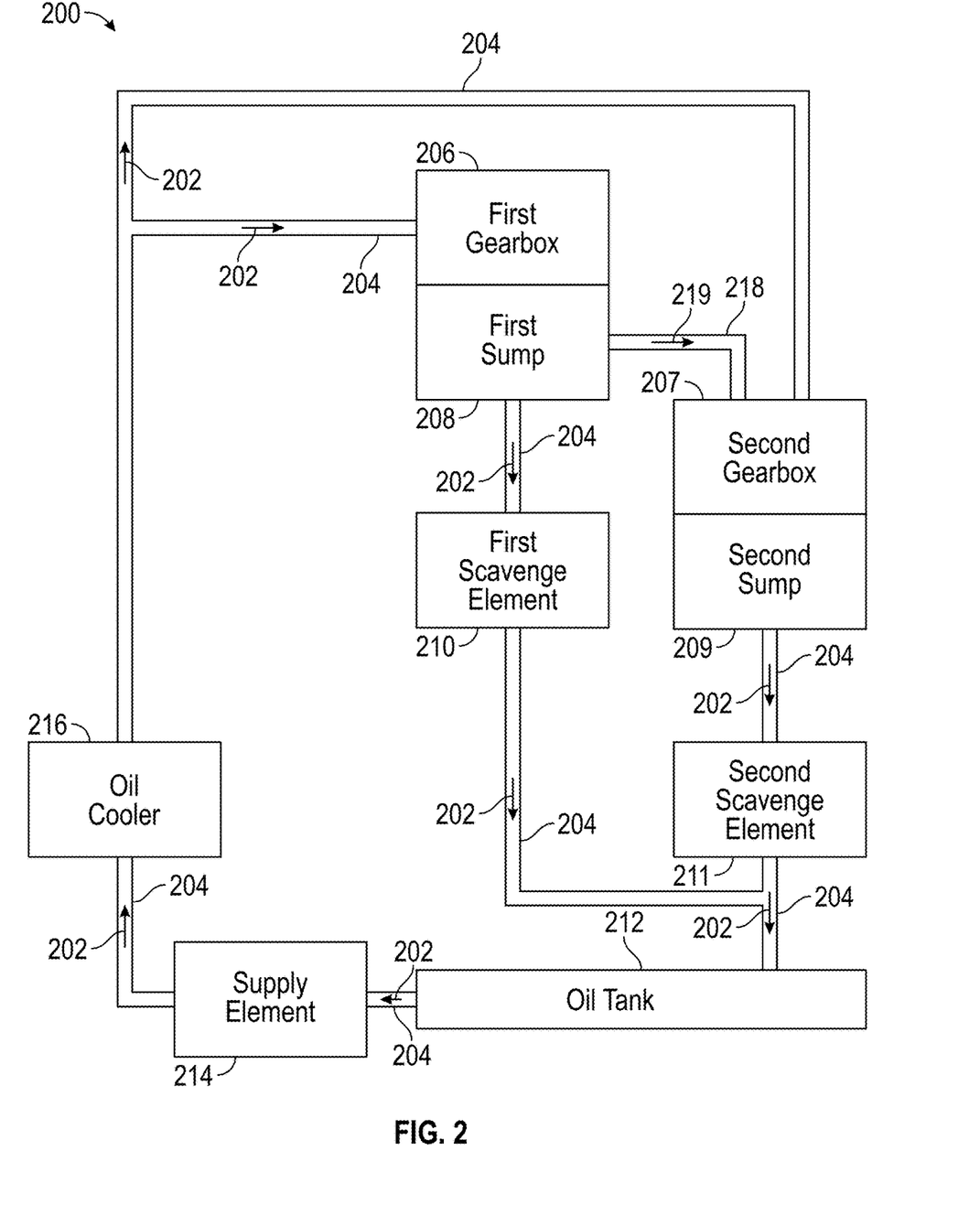
FIG. 2 is a schematic view of an oil circulation system in a turbine engine, according to the present disclosure.

FIG. 2 shows a schematic view of an oil circulation system 200 in the turbine engine 10 (FIG. 1). A flow of oil 202 is provided, via multiple oil lines 204 for internally lubricating a first gearbox 206 and a second gearbox 207. Specifically, the internal components of the first gearbox 206 and the second gearbox 207, such as gears and bearings, require liquid lubricant. Positioned below each of the first gearbox 206 and the second gearbox 207, a first sump 208 and a second sump 209, collect the oil 202 that has been circulated through the respective first gearbox 206 and second gearbox 207.

A first scavenge element 210 causes the oil 202 to flow from the first sump 208 to an oil tank 212 to maintain a desired level of oil 202 in the first sump 208. In some examples, the first scavenge element 210 may be a first scavenge pump. A second scavenge element 211 causes the oil 202 to flow from the second sump 209 to the oil tank 212 in order to maintain a desired level of oil 202 in the second sump 209. In some examples, the second scavenge element 211 may be a second scavenge pump.

In the event that the first scavenge element 210 fails, there will not be the suction required to move the oil 202 from the first sump 208 to the oil tank 212. This failure scenario may be referred to as a scavenge interruption. In such an example, the oil 202 continues to accumulate in the first sump 208 and is not removed therefrom. If level of oil 202 in the first sump 208 becomes too high, the first sump 208 becomes flooded. If the first gearbox 206 is flooded, the excess oil 202 will churn, causing excess viscous heat generation. Such excess heat generation may damage internal components of the first gearbox 206, or may degrade the oil 202.

The oil tank 212 holds a quantity of oil 202 to eventually be further circulated to the first gearbox 206 and the second gearbox 207 by the oil circulation system 200. The oil tank 212 holds a sufficient quantity of oil 202 to ensure that adequate oil 202 is available to maintain a continuous flow of oil 202, eventually to the first gearbox 206 and the second gearbox 207, despite any momentary interruptions in the flow of oil 202 in the oil circulation system 200. Because the oil tank 212 holds sufficient oil 202 to maintain a flow of oil 202, despite any interruptions, an overall quantity of oil 202 is present in the oil circulation system 200 sufficient to flood the first gearbox 206, if the first scavenge element 210 were to fail.

A supply element 214 provides a flow of oil 202, via a plurality of oil lines 204 from the oil tank 212 through an oil cooler 216, to the first gearbox 206 and the second gearbox 207. In some examples, the supply element 214 may be a supply pump. The oil cooler 216 is a heat exchanger that transfers residual heat in the oil 202 to a secondary fluid, such as ambient air or bypass air 62 (FIG. 1). The oil 202, after having been cooled in the oil cooler 216, has increased capacity for absorbing heat from the first gearbox 206 and the second gearbox 207, or for sinking the heat generated in the oil 202 when lubricating the first gearbox 206 and the second gearbox 207.

FIG. 2 shows two gearboxes 206 and 207, two sumps 208 and 209, and two scavenge elements 210 and 211. However, FIG. 2 is a generalized schematic view, and the turbine engine 10 (FIG. 1) may have more than two gearboxes for operating multiple various components of the turbine engine 10. For example, a first gearbox 206 may be an inlet gearbox that connects the engine starter motor to the core section through a radial drive shaft or a reduction gear box that connects the low-pressure shaft to the fan shaft. In the example of an inlet gearbox, the first gearbox 206 may transfer power from the engine starter motor to the high-pressure shaft to start the turbine engine and, during operating conditions, the radial drive shaft transfers power from the turbine engine to other gearboxes. The other gearboxes, also referred to as accessory drives, transfer gearboxes, or auxiliary gearboxes, may power other functions, including running the oil pumps, generating onboard electricity, or the like. Accordingly, the turbine engine 10 (FIG. 1) may include more than two sumps 208 and 209 and more than two scavenge elements 210 and 211. Likewise, FIG. 2 shows one each of the oil tank 212, the supply element 214, and the oil cooler 216, but the turbine engine 10 may have more than one oil tank 212, more than one supply element 214, and/or more than one oil cooler 216. Such pluralities may be designed redundancies. For example, a plurality of supply pumps ensures adequate lubrication within the turbine engine 10 in the event of a failure of one supply element 214. Finally, the oil circulation system 200, as shown in FIG. 2, has one oil line 204 between adjacent components, but the oil circulation system 200 may have a plurality of oil lines 204 between any two adjacent components.

The oil circulation system 200 includes a conduit 218 for the transfer of overflow oil 219, in the event of a failure of the first sump 208, such as in the failure state, when the first scavenge element 210 is not operational. The overflow oil 219 flows gravitationally through the conduit 218, to the second sump 209. Upon reaching the second sump 209, the overflow oil 219 may be pumped by the second scavenge element 211 to the oil tank 212, thus resuming normal circulation. This arrangement will be described in further detail, below.

Figure 3:
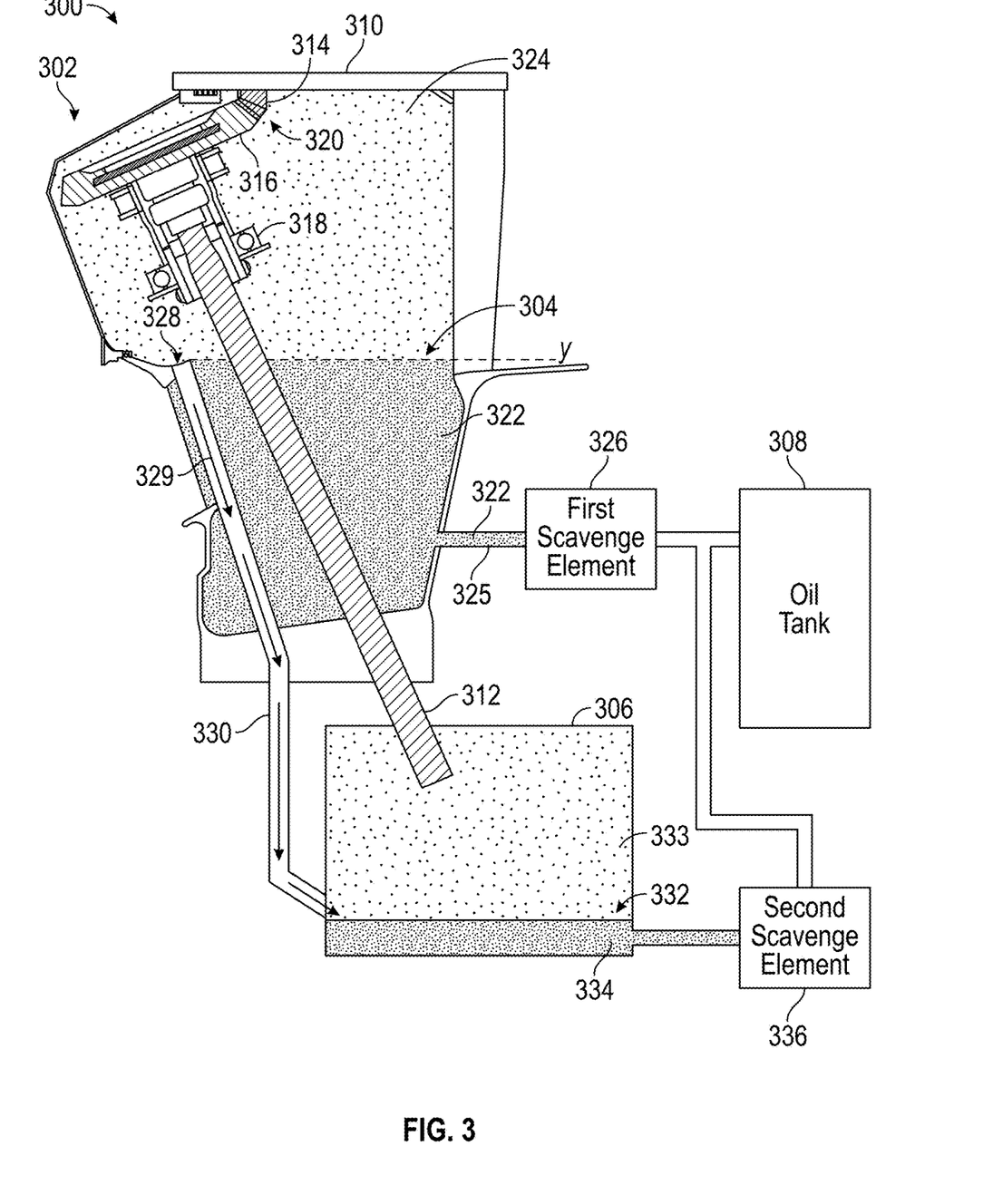
FIG. 3 is a schematic view of a scavenge arrangement for a turbine engine and oil management system, according to the present disclosure.

FIG. 3 shows a scavenge arrangement 300 of the turbine engine 10 (FIG. 1), including a first gearbox 302 with a first sump 304 located below. The scavenge arrangement 300 further includes a second gearbox 306. The first gearbox 302 is powered by a shaft 310. The shaft 310 may be the HP shaft 34, rotating about the longitudinal centerline axis 12 of the turbine engine 10 (FIG. 1).

The first gearbox 302 transfers rotational power from the shaft 310 to a radial driveshaft 312. A bevel gear 314 is attached to the shaft 310 and a pinion gear 316 is attached to the radial driveshaft 312. The speed of the radial driveshaft 312 depends on the gear ratio between the bevel gear 314 and the pinion gear 316. The rotation of the radial driveshaft 312 is supported by one or more bearings 318. The one or more bearings 318 may be one or more rolling element bearings such as ball bearings, roller bearings, tapered roller bearings, or needle bearings. Alternatively, the one or more bearings 318 may be plain bearings, such as journal bearings. The one or more bearings 318 may be a combination of the aforementioned bearing types, or may contain any other suitable bearing for supporting the rotation of the radial driveshaft 312.

The one or more bearings 318 and an interface 320 between the bevel gear 314 and the pinion gear 316 require continuous lubrication, in order to prevent damage due to friction, heat, abrasion, or the like. The lubrication is provided by the oil 202, as described with respect to the oil circulation system 200 of FIG. 2. The oil 202 may be provided to the first gearbox 206 and bearings with one or more oil nozzles that inject the oil 202 in a spray on to the geared rotating component and bearings. A portion of the oil 202 is collected as a first continuous liquid mass of oil 322 in the first sump 304 located below the first gearbox 302. Due to the movement of internal components, such as the rotation of the radial driveshaft 312, a portion of the first continuous liquid mass of oil 322 is agitated, generating a first mist of oil 324, suspended in the air of the first gearbox 302, over the first sump 304.

In the operational state, the quantity of the first continuous liquid mass of oil 322 in the first sump 304 is maintained by the outflow of the first continuous liquid mass of oil 322 through an oil line 325, out of the first sump 304, to a first scavenge element 326. The first scavenge element 326 returns the first continuous liquid mass of oil 322 to an oil tank 308, for continued circulation, as described with respect to the oil circulation system 200 of FIG. 2. A failure of the first scavenge element 326 will result in a rise of the level of the first continuous liquid mass of oil 322. If the quantity of the first continuous liquid mass of oil 322 rises too far, the first gearbox 302 becomes flooded. In such a failure state, where the first scavenge element 326 is unable to adequately remove the first continuous liquid mass of oil 322 at a rate to prevent flooding of the first gearbox 302, the level of first continuous liquid mass of oil 322 will rise to a threshold level, indicated in FIG. 3 by the reference line y. Upon reaching the threshold level y, a portion of the first continuous liquid mass of oil 322 overflows an upper opening 328 of a conduit 330, becoming overflow oil 329. The overflow oil 329 flows through the conduit 330, due to gravity, and exits into the second gearbox 306. In some examples, the first scavenge element 326 is a first scavenge pump 326.

The oil 202 may be provided to the second gearbox 306 with one or more oil nozzles that inject the oil 202 in a spray on to the geared rotating component and bearings Within the second gearbox 306, the overflow oil 329 received from the conduit 330 may contribute to the lubrication of the internal components of the second gearbox 306. Similar to the first gearbox 302, the movement of internal components, such as a rotating driveshaft within the second gearbox 306 agitates a second continuous liquid mass of oil 334 to generate a second mist of oil 333 suspended in the second gearbox 306. Within the second gearbox 306, the overflow oil 329 combines with, and becomes part of, a second continuous liquid mass of oil 334 collected in a second sump 332 located below the second gearbox 306. A second scavenge element 336 then pumps the second continuous liquid mass of oil 334, including any overflow oil 329 received from conduit 330, from the second sump 332 of the second gearbox 306 to the oil tank 308, where the second continuous liquid mass of oil 334, including the overflow oil 329, resumes normal circulation in the oil circulation system 200 as described with respect to FIG. 2. In some examples, the second scavenge element 336 may be a second scavenge pump 336.

Figure 4A:
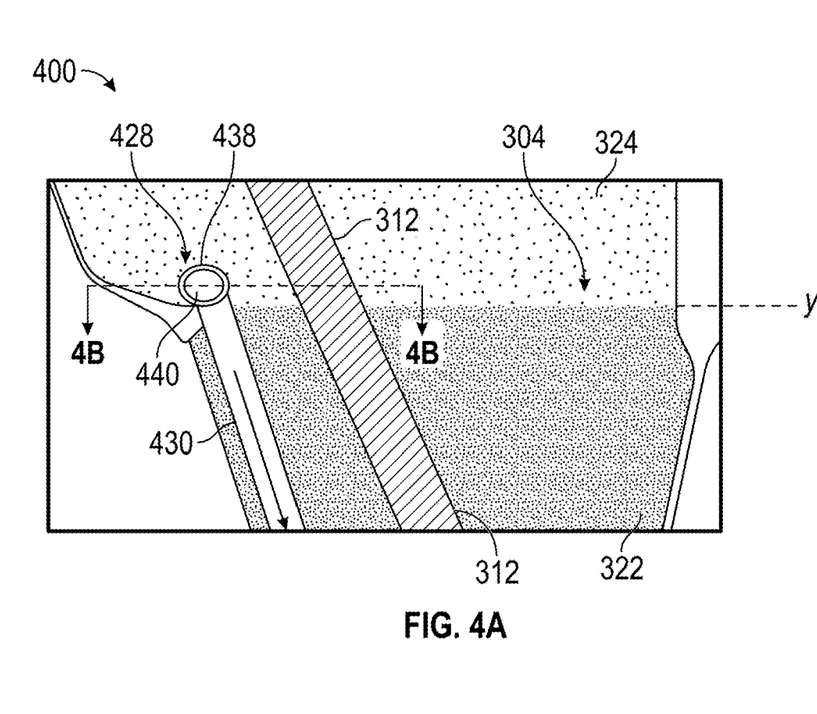
FIG. 4A is a schematic view of a portion of a scavenge arrangement, according to the present disclosure.
Figure 4B:
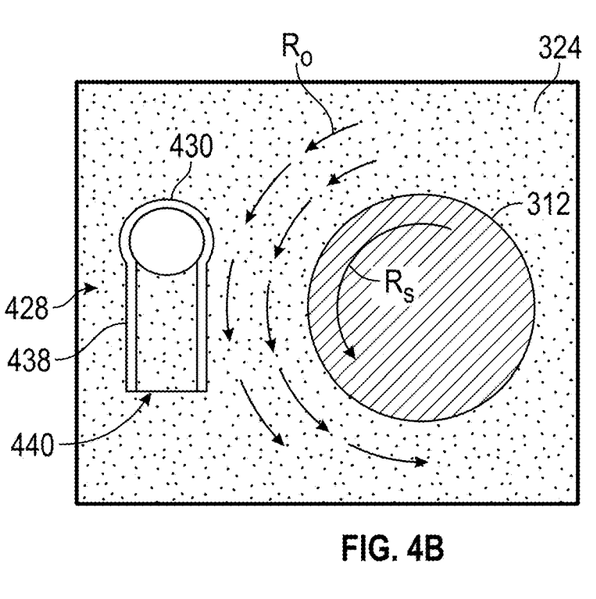
FIG. 4B is a schematic view of a portion of a scavenge arrangement, according to the present disclosure.

Referring now collectively to FIGS. 4A and 4B, a portion of a scavenge arrangement 400 is shown, that is substantially similar in function to the scavenge arrangement 300, described with respect to FIG. 3, except for the configuration of an upper opening 428 of a conduit 430. Accordingly, the same reference numerals will be used for components of the scavenge arrangement 400 that are the same as or similar to the components of the scavenge arrangement 300 as discussed above. The description of these components above also applies to this embodiment, and a detailed description of these components is omitted here. Likewise, the operation of the scavenge arrangement 400 is substantially the same as the operation of the scavenge arrangement 300 described with respect to FIG. 3.

The radial driveshaft 312 rotates within the first gearbox 302 and the first sump 304, as indicated by direction arrow $R_S$. The rotation of the radial driveshaft 312 also induces a similar circular flow pattern in the first mist of oil 324, indicated by direction arrow $R_O$. The first mist of oil 324 is essential to maintain proper lubrication of the components of the first gearbox 302, including the one or more bearings 318 and the interface 320, as shown in FIG. 2. To prevent inadvertent outflow of the first mist of oil 324 from the first gearbox 302, the upper opening 428 of the conduit 430 includes a radial head 438, arranged tangentially to the flow pattern $R_O$, as shown in FIG. 4B. An open end 440 faces downstream from the flow pattern $R_O$, mitigating the inflow of any of the first mist of oil 324. The upper opening 428 is situated at the threshold level y, to allow for the inflow of the first continuous liquid mass of oil 322, while resisting inflow of the first mist of oil 324 due to the rotation of the radial driveshaft 312 during the operational state.

Figure 5:
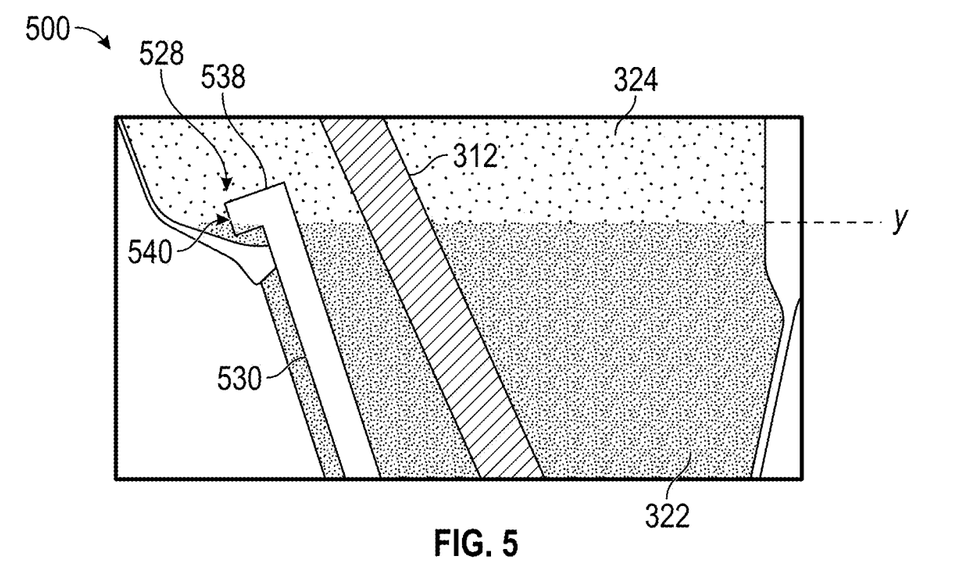
FIG. 5 is a schematic view of a portion of a scavenge arrangement, according to the present disclosure.

Referring now to FIG. 5, a portion of a scavenge arrangement 500 is shown, that is substantially similar in function to the scavenge arrangement 300, described with respect to FIG. 3, except for the configuration of an upper opening 528 of a conduit 530. Accordingly, the same reference numerals will be used for components of the scavenge arrangement 500 that are the same as or similar to the components of the scavenge arrangement 300 as discussed above. The description of these components above also applies to this embodiment, and a detailed description of these components is omitted here. Likewise, the operation of the scavenge arrangement 500 is substantially the same as operation of the scavenge arrangement 300, described with respect to FIG. 3.

To prevent inadvertent removal of the first mist of oil 324, the upper opening 528 of the conduit 530 includes a radial head 538, arranged radially with respect to the flow pattern $R_O$ (FIG. 4B). An open end 540 faces away from the rotating radial driveshaft 312, orthogonal to the flow pattern $R_O$, in order to prevent inadvertent inflow of the first mist of oil 324 during the operational state. Further, the open end 540 faces slightly downward, further mitigating any inadvertent entry of the first mist of oil 324 through the open end 540. In a failure state, where the first scavenge element 326 (FIG. 3) is unable to remove the first continuous liquid mass of oil 322, upon reaching the threshold level y, the first continuous liquid mass of oil 322 will overflow the upper opening 528 of the conduit 530, becoming the overflow oil 329. The overflow oil 329 enters the second gearbox 306 to be scavenged by the second scavenge element 336, as previously described, thus resuming normal circulation.

Figure 6:
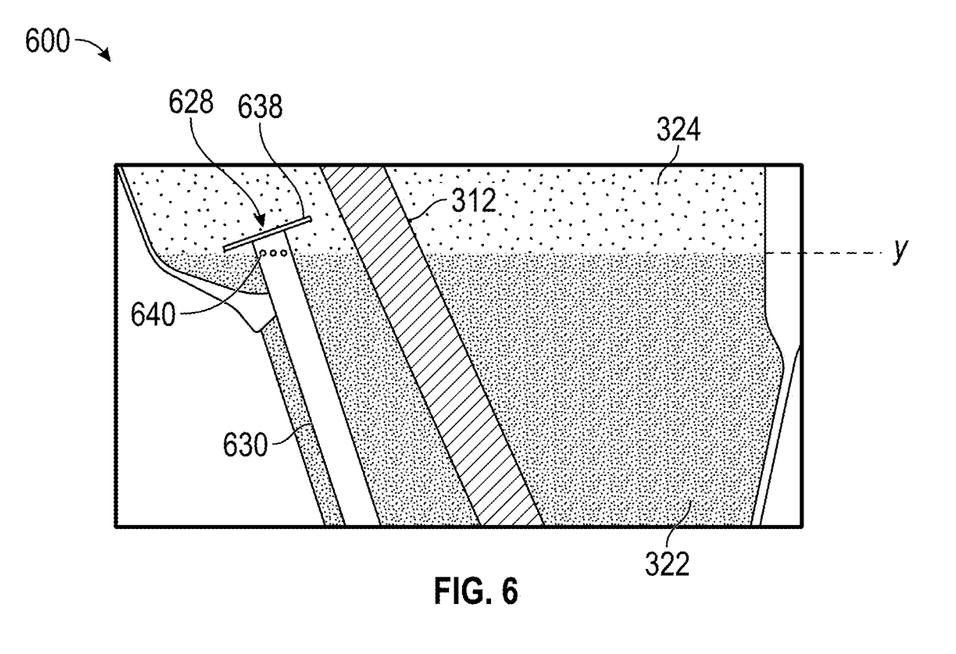
FIG. 6 is a schematic view of a portion of a scavenge arrangement, according to the present disclosure.

Referring now to FIG. 6, a portion of a scavenge arrangement 600 is shown, that is substantially similar in function to the scavenge arrangement 300, described with respect to FIG. 3, except for the configuration of an upper opening 628 of a conduit 630. Accordingly, the same reference numerals will be used for components of the scavenge arrangement 600 that are the same as or similar to the components of the scavenge arrangement 300 as discussed above. The description of these components above also applies to this embodiment, and a detailed description of these components is omitted here. Likewise, the operation of the scavenge arrangement 600 is substantially the same as the operation of the scavenge arrangement, described with respect to FIG. 3.

In order to prevent the inadvertent inflow of the first mist of oil 324 to the conduit 630, the upper opening 628 of the conduit is closed by an end cap 638. Radial holes 640 in the conduit 630, positioned at the threshold level y, allow for the inflow of the first continuous liquid mass of oil 322 to the conduit 530 at the threshold level y, such as in the failure state, when the first scavenge element 326 (FIG. 3) no longer removes the first continuous liquid mass of oil 322. The end cap 638 is of a greater diameter than the conduit 630, such that the end cap 638 overhangs the conduit 630 and the radial holes 640. The overhang of the end cap shields the radial holes 640 from the flow pattern $R_O$ (FIG. 4B) of the first mist of oil 324, mitigating the inadvertent inflow of the first mist of oil 324 in the operational state, while allowing for the inflow of the first continuous liquid mass of oil 322. The end cap 638 may be formed to the conduit by various means, including but not limited to joining processes such as welding or brazing, threading, or adhesion. Additionally, the end cap 638 may be joined to the conduit 630 by one or more fasteners such as screws, bolts, or rivets.

The radial holes 640 may be circumferentially arrayed about the circumference of the conduit 630. Alternatively, the radial holes may only be located in positions on the conduit 630 that mitigate the inflow of the first mist of oil 324 into the radial holes 640. Much the same as the open end 440 and the open end 540, as described with respect to FIGS. 4A, 4B, and 5 are arranged away from or orthogonal to the flow pattern $R_O$, respectively, the radial holes 640 may likewise be oriented away from, or orthogonal to, the flow pattern $R_O$. Such arrangement of the radial holes 640 allows for the inflow of the first continuous liquid mass of oil 322, upon reaching the threshold level y, while mitigating the removal of the first mist of oil 324.

Figure 7A:
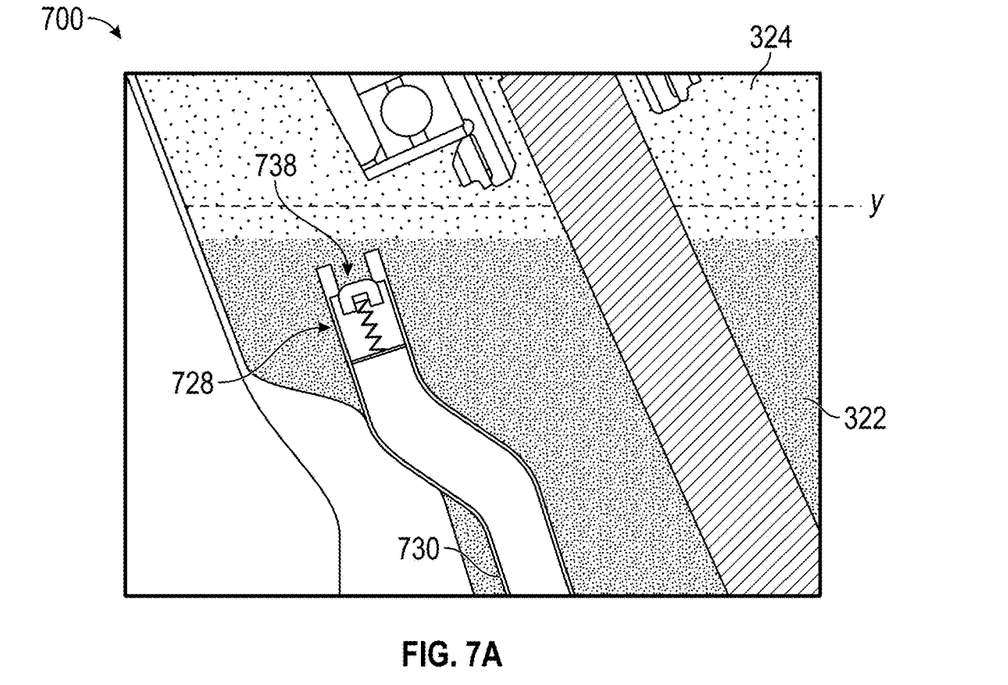
FIG. 7A is a schematic view of a portion of a scavenge arrangement in an operational state, according to the present disclosure.
Figure 7B:
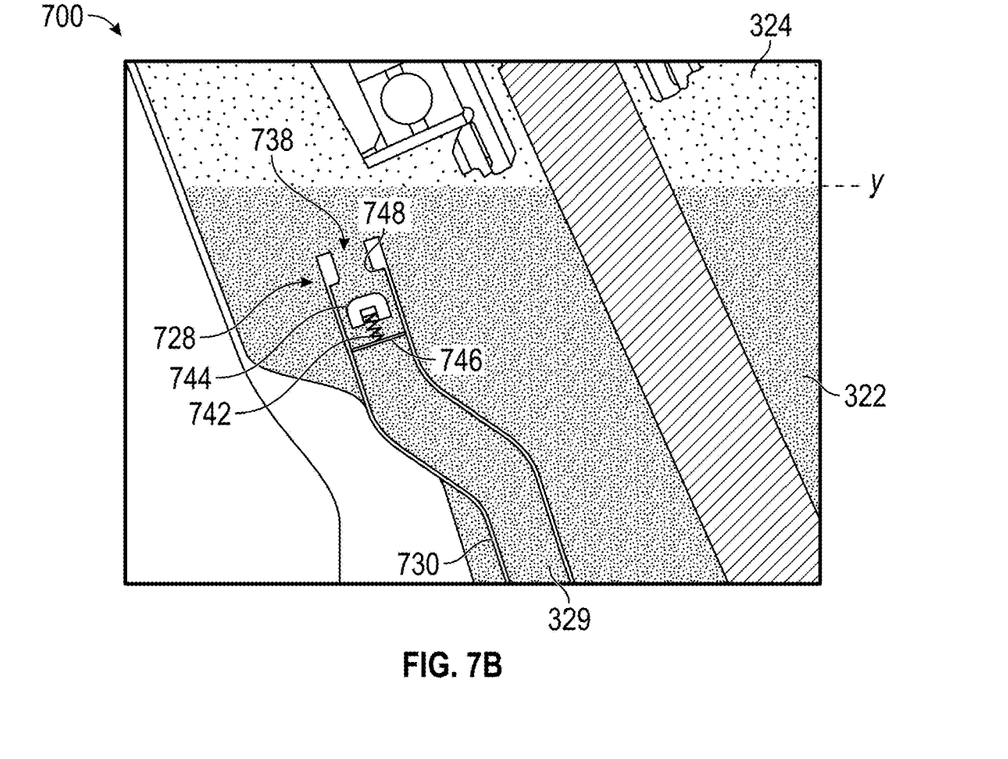
FIG. 7B is a schematic view of a portion of a scavenge arrangement in a failure state, according to the present disclosure.

Referring now collectively to FIGS. 7A and 7B, a portion of a scavenge arrangement 700 is shown, that is substantially similar in function to the scavenge arrangement 300, described with respect to FIG. 3, except for the inclusion of an axial valve assembly 738 at an upper end 728 of a conduit 730. Accordingly, the same reference numerals will be used for components of the scavenge arrangement 700 that are the same as or similar to the components of the scavenge arrangement 300 as discussed above. The description of these components above also applies to this embodiment, and a detailed description of these components is omitted here. Likewise, the operation of the portion of the scavenge arrangement 700 is substantially the same as the operation of the scavenge arrangement 300 and the portion of the scavenge arrangement 400, described with respect to FIG. 3.

In order to prevent the inadvertent inflow of the first mist of oil 324 to the conduit 730, the axial valve assembly 738 is affixed to the conduit 730. The axial valve assembly 738 includes an axial compression spring 742 and a valve member 744. The axial compression spring 742 is affixed at one end to the valve member 744 and at the opposite end to a fixed member 746. The fixed member 746 is attached to the conduit 730, and allows the throughflow of the overflow oil 329. The valve member 744 is held biased by the axial compression spring 742 against a valve stop 748 in the normally closed position, as shown in FIG. 7A, preventing the inflow of the first mist of oil 324.

During the operational state, the first continuous liquid mass of oil 322 is maintained at a level below the threshold level y, by the operation of the first scavenge element 326, and the axial valve assembly 738 remains closed, preventing the inflow of the first mist of oil 324 from the first gearbox 302. Upon the first continuous liquid mass of oil 322 reaching the threshold level y, such as in the failure state, when the first scavenge element 326 (FIG. 3) no longer removes the first continuous liquid mass of oil 322, the hydrostatic pressure of the first continuous liquid mass of oil 322 applies a downward force on the valve member 744, sufficient to compress the axial compression spring 742, displacing the valve member 744 from the valve stop 748, opening the axial valve assembly 738, as shown in FIG. 7B. Once opened, the axial valve assembly 738 allows the inflow of overflow oil 329, further flowing through the conduit 730, to the second gearbox 306 and, subsequently, to be removed by the second scavenge element 336 and to resume normal circulation. Upon the first continuous liquid mass of oil 322 returning below the threshold level y, the hydrostatic pressure of the first continuous liquid mass of oil 322 on the valve member 744 reduces, and the axial compression spring 742 displaces the valve member 744 back shut against the valve stop 748.

The portions of the scavenge arrangements 400, 500, and 600 as shown in FIGS. 4A to 6 include features for the removal of an excess of the first continuous liquid mass of oil 322. However, such features, including the open ends 440 and 540, and the radial holes 640 must be located at the threshold level y, in order to remove the excess first continuous liquid mass of oil 322. The axial valve assembly 738, however, need not be placed at the threshold level y. The axial valve assembly 738 opens not upon the first continuous liquid mass of oil 322 reaching the axial valve assembly 738, but upon the hydrostatic pressure of the first continuous liquid mass of oil 322 above the valve being sufficient to compress the axial compression spring 742, thus displacing the valve member 744 from the valve stop 748 and opening the axial valve assembly 738. For this reason, the axial valve assembly 738 may be placed near the upper end 728 of the conduit as shown in FIGS. 7A and 7B, or the axial valve assembly 738 may be placed in another location along the conduit 730, away from the upper end 728, that may be convenient advantageous for layout and spacing, for initial assembly, for maintenance, or for better function of the axial valve assembly 738. A lower placement of the axial valve assembly 738 along the conduit 730 would only require a stiffer axial compression spring 742, for the axial valve assembly 738 to open at the same threshold level y as an otherwise equivalent axial valve assembly 738 with a higher placement along the conduit 730.

Figure 8A:
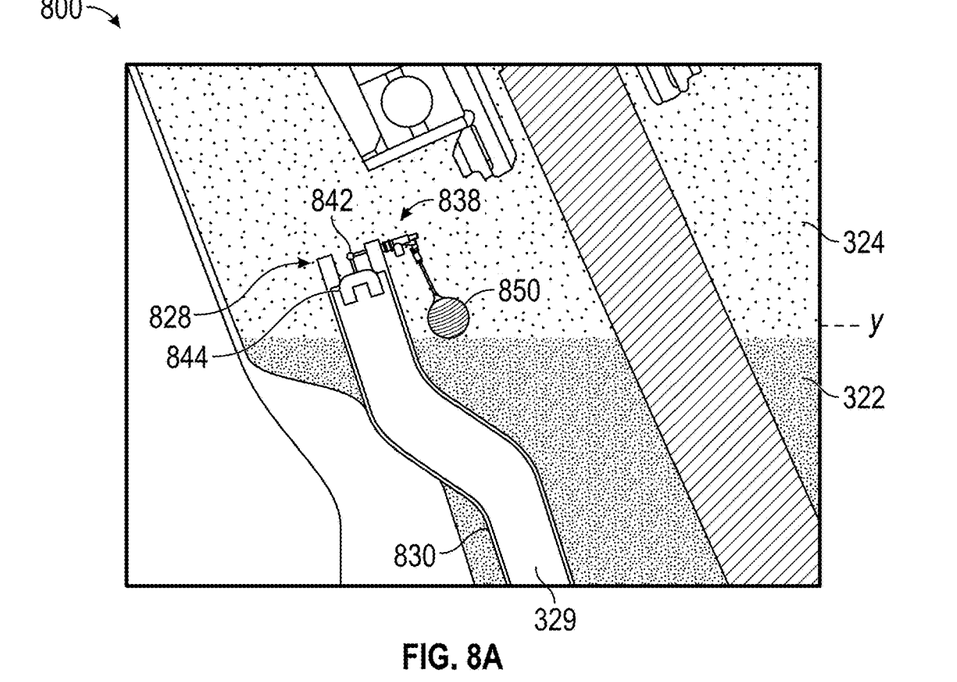
FIG. 8A is a schematic view of a portion of a scavenge arrangement in an operational state, according to the present disclosure.
Figure 8B:
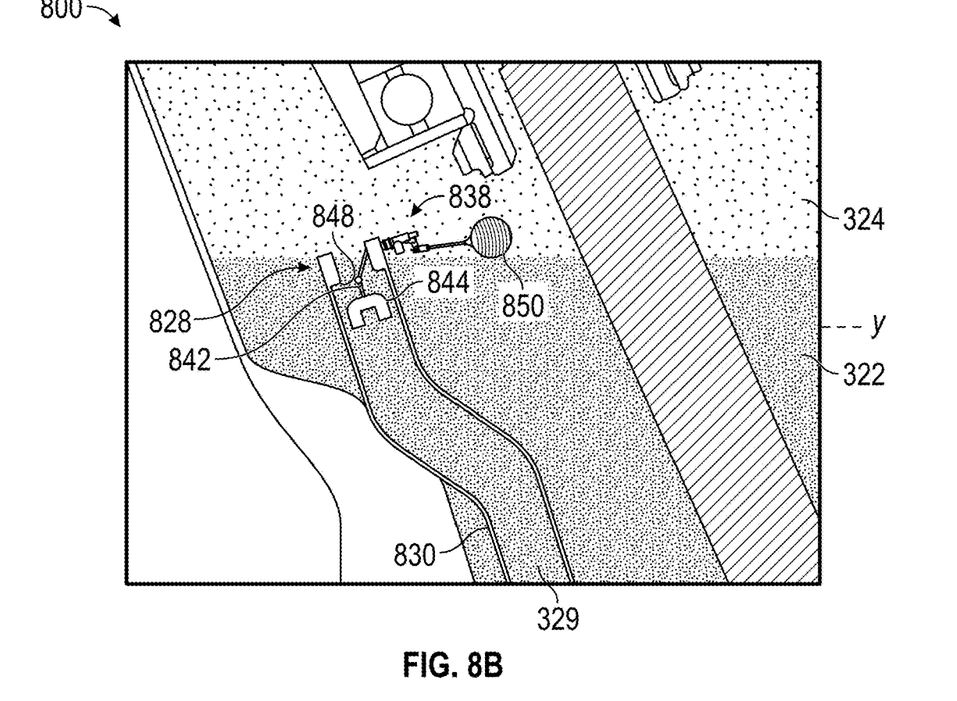
FIG. 8B is a schematic view of a portion of a scavenge arrangement in a failure state, according to the present disclosure.

Referring now collectively to FIGS. 8A and 8B, a portion of a scavenge arrangement 800 is shown, that is substantially similar in function to the scavenge arrangement 300, described with respect to FIG. 3, except for the inclusion of a float valve assembly 838 at an upper end 828 of a conduit 830. Accordingly, the same reference numerals will be used for components of the portion of the scavenge arrangement 800 that are the same as or similar to the components of the scavenge arrangement 300 as discussed above. The description of these components above also applies to this embodiment, and a detailed description of these components is omitted here. Likewise, the operation of the portion of the scavenge arrangement 800 is substantially the same as the operation of the scavenge arrangement 300, described with respect to FIG. 3.

In order to prevent the inadvertent inflow of the first mist of oil 324 to the conduit 830, the float valve assembly 838 is affixed to the conduit 830. The float valve assembly 838 includes a float 850 and a valve member 844. The float 850 is affixed to one end of a linkage 842, and the float 850 floats atop the upper surface of the first continuous liquid mass of oil 322. The valve member 844 is attached to the end of the linkage 842 opposite the float 850. As the level of the first continuous liquid mass of oil 322 rises, such as in the failure state, when the first scavenge element 326 (FIG. 3) no longer removes the first continuous liquid mass of oil 322, the float 850 also rises. Through the function of the linkage 842, the rising of the float 850 displaces the valve member 844 away from a valve stop 848, opening the float valve assembly 838 and allowing the throughflow of the overflow oil 329. The valve member 844 is held, biased by the float 850, connected via the linkage 842, against the valve stop 848 in the closed position, as shown in FIG. 8A, when the first continuous liquid mass of oil 322 is below the threshold level y. When the level of the first continuous liquid mass of oil 322 is below the lower extent of travel of the float 850, weight of the float 850 holds the float 850 down, and thus holds the valve member 844 against the valve stop 848, holding the float valve assembly 838 closed.

Figure 9A:
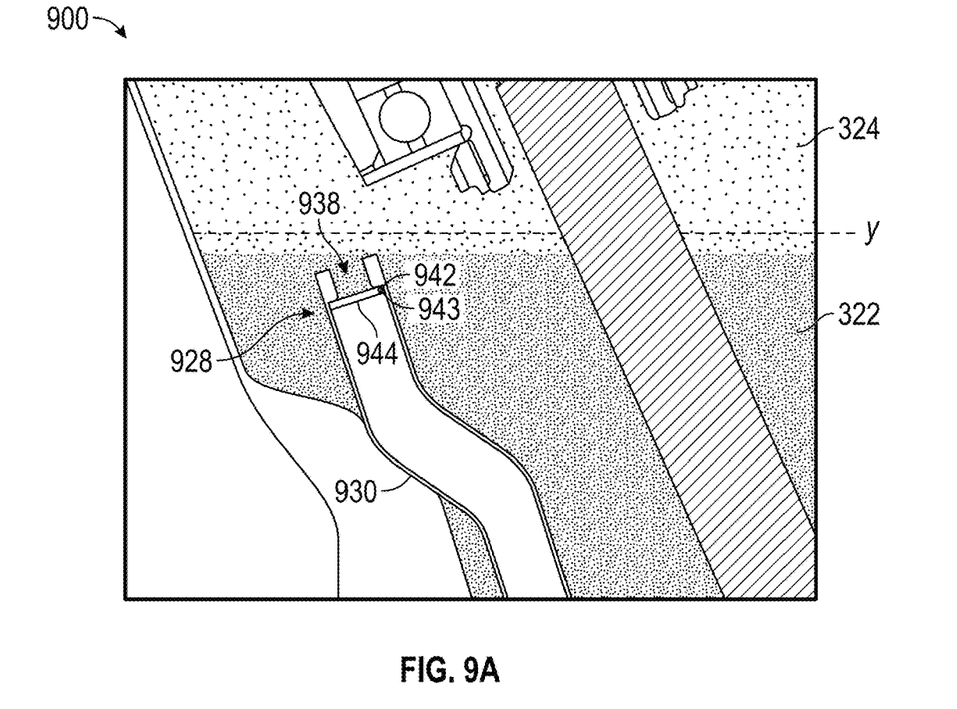
FIG. 9A is a schematic view of a portion of a scavenge arrangement in an operational state, according to the present disclosure.
Figure 9B:
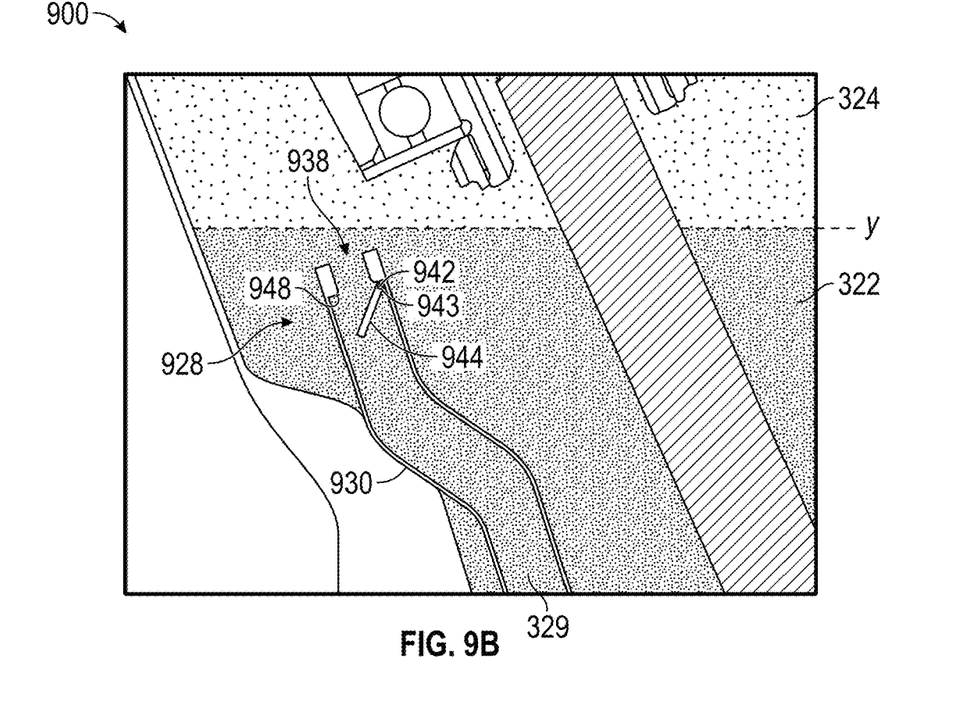
FIG. 9B is a schematic view of a portion of a scavenge arrangement in a failure state, according to the present disclosure.

Referring now collectively to FIGS. 9A and 9B, a portion of a scavenge arrangement 900 is shown, that is substantially similar in function to the scavenge arrangement 300, described with respect to FIG. 3, except for the inclusion of a flapper valve assembly 938 at an upper end 928 of a conduit 930. Accordingly, the same reference numerals will be used for components of the portion of the scavenge arrangement 900 that are the same as or similar to the components of the scavenge arrangement 300 as discussed above. The description of these components above also applies to this embodiment, and a detailed description of these components is omitted here. Likewise, the operation of the portion of the scavenge arrangement 900 is substantially the same as the operation of the scavenge arrangement 300, described with respect to FIG. 3.

In order to prevent the inadvertent inflow of the first mist of oil 324 to the conduit 930, the flapper valve assembly 938 is affixed to the conduit 930. The flapper valve assembly 938 includes a torsion spring 942 and a flapper 944. The torsion spring 942 is attached to a hinge 943 between the flapper 944 and the conduit 930. The flapper 944, which rotates at the hinge 943, is held biased by the torsion spring 942 against a valve stop 948 in the normally closed position, as shown in FIG. 7A.

In the operational state, the first scavenge element 326 maintains an outflow of the first continuous liquid mass of oil 322, and the flapper valve assembly 938 remains closed, preventing inflow of the first mist of oil 324 to the conduit 930. Upon the first continuous liquid mass of oil 322 reaching the threshold level y, such as in the failure state, when the first scavenge element 326 (FIG. 3) no longer removes the first continuous liquid mass of oil 322, the hydrostatic pressure of the first continuous liquid mass of oil 322 applies a downward force on the flapper 944, sufficient to twist the torsion spring 942, opening the flapper valve assembly 938, as shown in FIG. 9B. Once opened, the flapper valve assembly 938 allows the inflow of overflow oil 329, further flowing to the second gearbox 306 (FIG. 3) and, subsequently, to be removed by the second scavenge element 336 (FIG. 3) to resume normal circulation. Upon the first continuous liquid mass of oil 322 returning below the threshold level y, the hydrostatic pressure of the first continuous liquid mass of oil 322 on the flapper 944 reduces, and the torsion spring 942 rotates the flapper 944 back shut against the valve stop 948.

Similar to the axial valve assembly 738 described with respect to FIGS. 7A and 7B, the flapper valve assembly 938 need not be placed at the threshold level y. The flapper valve assembly 938 opens not upon the first continuous liquid mass of oil 322 reaching the flapper valve assembly 938, but upon the hydrostatic pressure of the first continuous liquid mass of oil 322 on the flapper 944 being sufficient to apply a torsion on the torsion spring 942, allowing rotation the flapper 944 about the hinge 943, away from the valve stop 948, opening the flapper valve assembly 938. For this reason, the flapper valve assembly 938 may be placed near the upper end 928 of the conduit 930 as shown in FIGS. 9A and 9B, or the flapper valve assembly 938 may be placed away from the upper end 928, in another location along the conduit 930, that may be advantageous for layout and spacing, for initial assembly, for maintenance, or for better function of the flapper valve assembly 938. A lower placement of the flapper valve assembly 938 along the conduit 930 would only require a stiffer torsion spring 942, for the flapper valve assembly 938 to open at the same threshold level y as an otherwise equivalent flapper valve assembly 938 with a higher placement along the conduit 930.

In the examples of FIGS. 7A to 9, the valve assemblies may be alternatively, or additionally, connected to the drain mast. The drain mast is the location where the exit point of all drain tubes are connected, and the drain mast opens to the atmosphere. When the valve assembly conduit is connected to the drain mast, the valve assembly works as a drain system during the failure scenario.

A scavenge arrangement in a turbine engine removes an excess of a continuous liquid mass of oil from a sump of a gearbox in a failure state, such as a failure of a scavenge pump. Overflow oil flows through a conduit to a secondary gearbox, such as a transfer gearbox, and is then pumped via a scavenge pump to an oil tank to resume normal circulation. The scavenge arrangement allows for continued circulation of oil in the turbine engine, even in the event of a scavenge pump failure. The conduit may be fitted with various features to prevent the inflow of a mist of oil. The features include radial heads oriented away from the flow pattern of the mist of oil, as well as caps and valves.

Further aspects are provided by the subject matter of the following clauses.

A turbine engine comprising a compressor that compresses air, a combustor that receives fuel and the compressed air, and combusts the compressed air and the fuel to generate combustion gases, a turbine that receives the combustion gases and rotates, a shaft connecting the compressor and the turbine, such that the compressor and the turbine rotate together, a first gearbox, powered by the shaft, comprising at least one interface between gears lubricated by oil, the oil generating a first mist of oil, a first sump, located below the first gearbox for collecting the first mist of oil into a first continuous liquid mass of oil from the first gearbox, a first scavenge element that pumps the first continuous liquid mass of oil from the first sump when the first scavenge element is in an operational state and does not pump the first continuous liquid mass of oil when the first scavenge element is in a failure state, a second gearbox, a second sump, located below the second gearbox, for collecting the second mist of oil into a second continuous liquid mass of oil from the second gearbox, a second scavenge element that pumps the second continuous liquid mass of oil from the second sump in both the operational state and in the failure state, and a conduit, connecting the first sump to the second sump, for transfer of overflow oil from the first sump to the second sump in the failure state, the overflow oil combining with the second continuous liquid mass of oil, upon the first continuous liquid mass of oil reaching a threshold level in the first sump.

The turbine engine of the preceding clause, wherein the overflow oil flows due to gravity in the conduit.

The turbine engine of any preceding clause, wherein the overflow oil lubricates the second gearbox.

The turbine engine of any preceding clause, wherein the first mist of oil is generated by a driveshaft rotating in the first continuous liquid mass of oil in the first sump, and the second mist of oil is generated by a driveshaft rotating in the second continuous liquid mass of oil in the second sump.

The turbine engine of any preceding clause, wherein the conduit is closed by an end cap to prevent inflow of the first mist of oil and the conduit comprises radial holes located at the threshold level to permit the inflow of the overflow oil.

The turbine engine of the preceding clause, wherein the end cap overhangs the conduit to shield the radial holes, mitigating inflow of the mist of oil to the radial holes.

The turbine engine of any preceding clause, wherein the radial holes are arranged in the conduit, facing away from a flow pattern of the first mist of oil, in order to mitigate inflow of the first mist of oil.

The turbine engine of any preceding clause, wherein the conduit comprises a valve assembly that is closed when the first continuous liquid mass of oil is below the threshold level to prevent inflow of the first mist of oil, and is open when the first continuous liquid mass of oil reaches the threshold level, permitting inflow of overflow oil.

The turbine engine of the preceding clause, wherein the valve assembly is an axial valve assembly comprising a valve stop, a valve member that closes against the valve stop in a normally closed position, and an axial compression spring that holds the valve member against the valve stop in the normally closed position, the axial compression spring compressing under hydrostatic pressure from the first continuous liquid mass of oil at the threshold level, displacing the valve member from the valve stop, opening the valve assembly to permit inflow of the overflow oil.

The turbine engine of any preceding clause, wherein the valve assembly is a float valve assembly comprising a valve stop, a valve member that closes against the valve stop in a normally closed position, and a float that floats atop the first continuous liquid mass of oil, connected to the valve member via a linkage, such that, upon the first continuous liquid mass of oil reaching the threshold level, the float rises, and the linkage displaces the valve member from the valve stop, opening the float valve assembly to permit the inflow of the overflow oil.

The turbine engine of any preceding clause, wherein the valve assembly is a flapper valve assembly comprising a valve stop, a flapper that rotates about a hinge to close against the valve stop in a normally closed position, and a torsion spring at the hinge, connected to the flapper and to the conduit, that holds the flapper against the valve stop in the normally closed position, the torsion spring twisting under hydrostatic pressure from the first continuous liquid mass of oil at the threshold level, to displace the flapper from the valve stop, opening the flapper valve assembly to permit inflow of the overflow oil.

The turbine engine of any preceding clause, wherein the valve assembly is located at an upper end of the conduit, near the threshold level.

The turbine engine of any preceding clause, wherein the valve assembly is located away from the threshold level.

The turbine engine of any preceding clause, wherein the first scavenge element pumps the first continuous liquid mass of oil to an oil tank when in an operational state and does not pump the first continuous liquid mass of oil to the oil tank when in a failure state, and the second scavenge element pumps the second continuous liquid mass of oil to the oil tank in both the operational state and in the failure state.

The turbine engine of the preceding clause, further comprising a supply element that pumps oil from the oil tank to the first gearbox and to the second gearbox.

The turbine engine of any preceding clause, wherein the conduit comprises an upper opening at the threshold level in the first sump for receiving the overflow oil.

The turbine engine of the preceding clause, wherein the upper opening comprises a radial head located at the threshold level, the radial head having an open end for inflow of the overflow oil.

The turbine engine of the preceding clause, wherein the radial head is angled downward, to mitigate inflow of the first mist of oil.

The turbine engine of any preceding clause, wherein the radial head is arranged parallel to a flow pattern of the first mist of oil, the open end facing away from the flow pattern, to mitigate inflow of the first mist of oil.

The turbine engine of any preceding clause, wherein the radial head is arranged orthogonal to a flow pattern of the first mist of oil, the open end facing away from the flow pattern, to mitigate inflow of the first mist of oil.

A method of circulating oil in a turbine engine, the method comprising pumping the oil with a supply element from an oil tank to a first gearbox for lubrication, pumping the oil with the supply element from the oil tank to a second gearbox for lubrication, collecting the oil as a first continuous liquid mass of oil in a first sump, collecting the oil as a second continuous liquid mass of oil in a second sump, in an operational state, pumping the first continuous liquid mass of oil with a first scavenge element from the first sump, in a failure state, upon the first continuous liquid mass of oil reaching a threshold level, causing overflow oil to flow via a conduit, from the first sump to the second continuous liquid mass of oil second sump, and pumping the second continuous liquid mass of oil in the second sump with a second scavenge element from the second sump.

The method of the preceding clause, wherein the overflow oil flows due to gravity in the conduit.

The method of any preceding clause, wherein the overflow oil lubricates the second gearbox.

The method of any preceding clause, further comprising generating a first mist of oil by a driveshaft rotating in the first continuous liquid mass of oil in the first sump, and generating a second mist of oil by a driveshaft rotating in the second continuous liquid mass of oil in the second sump.

The method of any preceding clause, further comprising preventing inflow of the first mist of oil by an end cap and permitting the inflow of overflow oil to the conduit by radial holes located at the threshold level.

The method of the preceding clause, wherein the end cap overhangs the conduit to shield the radial holes, mitigating inflow of the mist of oil to the radial holes.

The method of any preceding clause, wherein the radial holes are arranged in the conduit, facing away from a flow pattern of the first mist of oil, in order to mitigate inflow of the first mist of oil.

The method of any preceding clause, further comprising closing a valve assembly when the first continuous liquid mass of oil is below the threshold level to prevent inflow of the first mist of oil to the conduit, and opening the valve when the first continuous liquid mass of oil reaches a threshold level, to permit the inflow of overflow oil to the conduit.

The method of the preceding clause, wherein the valve assembly is an axial valve assembly comprising a valve stop, a valve member that closes against the valve stop in a normally closed position, and an axial compression spring that holds the valve member against the valve stop in the normally closed position, the axial compression spring compressing under hydrostatic pressure from the first continuous liquid mass of oil at the threshold level, displacing the valve member from the valve stop, opening the valve assembly to permit inflow of the overflow oil.

The method of any preceding clause, wherein the valve assembly is a float valve assembly comprising a valve stop, a valve member that closes against the valve stop in a normally closed position, and a float that floats atop the first continuous liquid mass of oil, connected to the valve member via a linkage, such that upon the first continuous liquid mass of oil reaching the threshold level, the float rises, and the linkage displaces the valve member from the valve stop, opening the float valve assembly to permit the inflow of the overflow oil.

The method of any preceding clause, wherein the valve assembly is a flapper valve assembly comprising a valve stop, a flapper that rotates about a hinge to close against the valve stop in a normally closed position, and a torsion spring at the hinge, connected to the flapper and to the conduit, that holds the flapper against the valve stop in the normally closed position, the torsion spring twisting under hydrostatic pressure from the first continuous liquid mass of oil at the threshold level, to displace the flapper from the valve stop, opening the flapper valve assembly to permit inflow of the overflow oil.

The method of any preceding clause, wherein the valve assembly is located at an upper end of the conduit, near the threshold level.

The method of any preceding clause, wherein the valve assembly is located away from the threshold level.

The method of any preceding clause, further comprising pumping the first continuous liquid mass of oil to an oil tank with a first scavenge element, in the operational state, not pumping the first continuous liquid mass of oil to an oil tank with a first scavenge element, in the failure state, and pumping the second continuous liquid mass of oil to an oil tank with a second scavenge element, in both the operational state and the failure state.

The method of the preceding clause, further comprising pumping oil from the oil tank to the first gearbox and to the second gearbox with a supply element.

The method of any preceding clause, further comprising causing the overflow oil to flow through an upper opening in the conduit, at the threshold level.

The method of the preceding clause, wherein the upper opening comprises a radial head located at the threshold level, the radial head having an open end for inflow of the overflow oil.

The method of the preceding clause, wherein the radial head is angled downward, to mitigate inflow of the first mist of oil.

The method of any preceding clause, wherein the radial head is arranged parallel to a flow pattern of the first mist of oil, the open end facing away from the flow pattern, to mitigate inflow of the first mist of oil.

The method of any preceding clause, wherein the radial head is arranged orthogonal to a flow pattern of the first mist of oil, the open end facing away from the flow pattern, to mitigate inflow of the first mist of oil.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A turbine engine comprising:
 a compressor that is configured to generate compressed air;
 a combustor that is configured to receive fuel and the compressed air, and configured to combust the compressed air and the fuel to generate combustion gases;
 a turbine that is configured to receive the combustion gases and rotate;
 a shaft connecting the compressor and the turbine, such that the compressor and the turbine rotate together;
 a first gearbox, powered by the shaft, comprising at least one interface between gears lubricated by oil, the oil generating a first mist of oil;
 a first sump, located below the first gearbox for collecting the first mist of oil into a first continuous liquid mass of oil from the first gearbox;
 a first scavenge element fluidly connected to the first sump, the first scavenge element configured to pump the first continuous liquid mass of oil from the first sump when the first scavenge element is in an operational state and configured to not pump the first continuous liquid mass of oil when the first scavenge element is in a failure state;
 a second gearbox, lubricated by the oil, the oil generating a second mist of oil;
 a second sump, located below the second gearbox, for collecting the second mist of oil into a second continuous liquid mass of oil from the second gearbox;
 a second scavenge element fluidly connected to the second sump, the second scavenge element configured to pump the second continuous liquid mass of oil from the second sump in both the operational state and in the failure state; and
 a conduit fluidly connecting the first sump to the second sump, the conduit configured to transfer overflow oil from the first sump to the second sump in the failure state, the overflow oil combining with the second continuous liquid mass of oil, upon the first continuous liquid mass of oil reaching a threshold level in the first sump.

2. The turbine engine of claim 1, wherein the overflow oil flows due to gravity in the conduit.

3. The turbine engine of claim 1, wherein the overflow oil lubricates the second gearbox.

4. The turbine engine of claim 1, wherein the first mist of oil is generated by a driveshaft rotating in the first continuous liquid mass of oil in the first sump, and the second mist of oil is generated by a driveshaft rotating in the second continuous liquid mass of oil in the second sump.

5. The turbine engine of claim 1, wherein the first scavenge element is fluidly connected to an oil tank, the first scavenge element further configured to pump the first continuous liquid mass of oil to the oil tank when in the operational state and to not pump the first continuous liquid mass of oil to the oil tank when in the failure state, and the second scavenge element is fluidly connected to the oil tank, the second scavenge element configured to pump the second continuous liquid mass of oil to the oil tank in both the operational state and in the failure state.

6. The turbine engine of claim 5, further comprising a supply element fluidly connecting the oil tank to the first gearbox and to the second gearbox, the supply element configured to pump oil from the oil tank to the first gearbox and to the second gearbox.

7. The turbine engine of claim 1, wherein the conduit is closed by an end cap to prevent inflow of the first mist of oil and the conduit comprises radial holes located at the threshold level to permit the inflow of the overflow oil.

8. The turbine engine of claim 7, wherein the end cap overhangs the conduit to shield the radial holes, mitigating inflow of the mist of oil to the radial holes.

9. The turbine engine of claim 7, wherein the radial holes are arranged in the conduit, facing away from a flow pattern of the first mist of oil, in order to mitigate inflow of the first mist of oil.

10. The turbine engine of claim 1, wherein the conduit comprises a valve assembly that is closed when the first continuous liquid mass of oil is below the threshold level to prevent inflow of the first mist of oil, and is open when the first continuous liquid mass of oil reaches the threshold level, permitting inflow of overflow oil.

11. The turbine engine of claim 10, wherein the valve assembly is an axial valve assembly comprising:
 a valve stop;
 a valve member that closes against the valve stop in a normally closed position; and
 an axial compression spring that holds the valve member against the valve stop in the normally closed position, the axial compression spring compressing under hydrostatic pressure from the first continuous liquid mass of oil at the threshold level, displacing the valve member from the valve stop, opening the axial valve assembly to permit inflow of the overflow oil.

12. The turbine engine of claim 10, wherein the valve assembly is a float valve assembly comprising:
 a valve stop;
 a valve member that closes against the valve stop in a normally closed position; and
 a float that floats atop the first continuous liquid mass of oil, connected to the valve member via a linkage, such that upon the first continuous liquid mass of oil reaching the threshold level, the float rises, and the linkage displaces the valve member from the valve stop, opening the float valve assembly to permit the inflow of the overflow oil.

13. The turbine engine of claim 10, wherein the valve assembly is a flapper valve assembly comprising:
 a valve stop;
 a flapper that rotates about a hinge to close against the valve stop in a normally closed position; and
 a torsion spring at the hinge, connected to the flapper and to the conduit, that holds the flapper against the valve stop in the normally closed position, the torsion spring twisting under hydrostatic pressure from the first continuous liquid mass of oil at the threshold level, to displace the flapper from the valve stop, opening the flapper valve assembly to permit inflow of the overflow oil.

14. The turbine engine of claim 10, wherein the valve assembly is located at an upper end of the conduit, near the threshold level.

15. The turbine engine of claim 10, wherein the valve assembly is located away from the threshold level.

16. The turbine engine of claim 1, wherein the conduit comprises an upper opening at the threshold level in the first sump for receiving the overflow oil.

17. The turbine engine of claim 16, wherein the upper opening comprises a radial head located at the threshold level, the radial head having an open end for inflow of the overflow oil.

18. The turbine engine of claim 17, wherein the radial head is angled downward, to mitigate inflow of the first mist of oil.

19. The turbine engine of claim 17, wherein the radial head is arranged parallel to a flow pattern of the first mist of oil, the open end facing away from the flow pattern, to mitigate inflow of the first mist of oil.

20. The turbine engine of claim 17, wherein the radial head is arranged orthogonal to a flow pattern of the first mist of oil, the open end facing away from the flow pattern, to mitigate inflow of the first mist of oil.

* * * * *